US011424512B2

(12) United States Patent
Ku et al.

(10) Patent No.: US 11,424,512 B2
(45) Date of Patent: Aug. 23, 2022

(54) ALL-SOLID SECONDARY BATTERY AND METHOD OF MANUFACTURING THE SAME

(71) Applicants: Samsung Electronics Co., Ltd., Suwon-si (KR); Samsung SDI Co., Ltd., Yongin-si (KR)

(72) Inventors: Junhwan Ku, Seongnam-si (KR); Hyorang Kang, Anyang-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 13 days.

(21) Appl. No.: 16/580,313

(22) Filed: Sep. 24, 2019

(65) Prior Publication Data

US 2020/0144575 A1 May 7, 2020

(30) Foreign Application Priority Data

Nov. 2, 2018 (KR) .................. 10-2018-0133843

(51) Int. Cl.
*H01M 50/46* (2021.01)
*H01M 10/0562* (2010.01)
(Continued)

(52) U.S. Cl.
CPC ......... *H01M 50/461* (2021.01); *H01M 4/364* (2013.01); *H01M 4/38* (2013.01);
(Continued)

(58) Field of Classification Search
CPC . H01M 2300/0097; H01M 2300/0068; H01M 2300/0088; H01M 10/0565;
(Continued)

(56) References Cited

U.S. PATENT DOCUMENTS 7,824,795 B2    11/2010  Yoshida et al.
8,197,970 B2    6/2012   Kanda et al.
(Continued)

FOREIGN PATENT DOCUMENTS

CN    105470568 A    4/2016
CN    104916869 B    4/2017
(Continued)

OTHER PUBLICATIONS

Mingard, K., et al. "Good Practice Guide for Improving the Consistency of Particle Size Measurement. A National Measurement Good Practice Guide 111." (2009). (Year: 2009).*

(Continued)

*Primary Examiner* — Maria Laios
*Assistant Examiner* — Grace Ann Kenlaw
(74) *Attorney, Agent, or Firm* — Cantor Colburn LLP

(57) ABSTRACT

An all-solid secondary battery includes an anode layer; a cathode layer; a solid electrolyte layer interposed between the anode layer and the cathode layer, and including a first solid electrolyte; and a first bonding layer disposed between the cathode layer and the solid electrolyte layer, and comprising a second solid electrolyte, wherein the anode layer includes an anode current collector and an anode active material layer disposed on the anode current collector, and the anode active material layer includes a binder and an anode active material, wherein the cathode layer includes a cathode current collector and a cathode active material layer disposed on the cathode current collector, and wherein the second solid electrolyte has a Young's modulus which is less than a Young's modulus of the first solid electrolyte.

31 Claims, 8 Drawing Sheets

(51) Int. Cl.
  *H01M 4/36* (2006.01)
  *H01M 4/587* (2010.01)
  *H01M 4/38* (2006.01)
  *H01M 4/02* (2006.01)
  *H01M 10/0585* (2010.01)

(52) U.S. Cl.
  CPC ....... *H01M 4/587* (2013.01); *H01M 10/0562* (2013.01); *H01M 10/0585* (2013.01); *H01M 2004/021* (2013.01); *H01M 2004/027* (2013.01); *H01M 2300/0068* (2013.01); *H01M 2300/0097* (2013.01)

(58) Field of Classification Search
  CPC ........... H01M 10/347; H01M 10/3963; H01M 4/366; H01M 50/461
  See application file for complete search history.

(56) References Cited

U.S. PATENT DOCUMENTS

| | | | |
|---|---|---|---|
| 9,887,432 B2 | 2/2018 | Nizou et al. | |
| 2014/0093786 A1* | 4/2014 | Ito | H01M 4/131 429/322 |
| 2017/0338522 A1 | 11/2017 | Hu et al. | |

FOREIGN PATENT DOCUMENTS

| | | | |
|---|---|---|---|
| CN | 106960982 A | * | 7/2017 |
| JP | 2008135287 A | * | 6/2008 |
| JP | 2008135287 A | | 6/2008 |
| JP | 5151692 B2 | | 2/2013 |
| JP | 5281896 B2 | | 9/2013 |
| JP | 5910737 B2 | | 4/2016 |
| KR | 20170069071 A | | 6/2017 |
| KR | 20180031949 A | | 3/2018 |
| KR | 1020180091678 A | | 8/2018 |
| WO | 2013175993 A1 | | 11/2013 |

OTHER PUBLICATIONS

Sakuda, Atsushi, et al. "Evaluation of elastic modulus of Li2S-P2S5 glassy solid electrolyte by ultrasonic sound velocity measurement and compression test." Journal of the Ceramic Society of Japan 121.1419 (2013): 946-949. (Year: 2013).*

Yu, Chuang, et al. "Facile synthesis toward the optimal structure-conductivity characteristics of the argyrodite Li6PS5CI solid-state electrolyte." ACS applied materials & interfaces 10.39 (2018): 33296-33306. (Year: 2018).*

Korean Office Action for Korean Patent Application No. 10-2019-0113013 dated Dec. 1, 2020.

* cited by examiner

ALL-SOLID SECONDARY BATTERY AND METHOD OF MANUFACTURING THE SAME

CROSS-REFERENCE TO RELATED APPLICATION

This application claims priority to and the benefits of Korean Patent Application No. 10-2018-0133843, filed on Nov. 2, 2018, and No. 10-2019-0113013, filed on Sep. 11, 2019, in the Korean Intellectual Property Office, and all the benefits accruing therefrom under 35 U.S.C. § 119, the content of which is incorporated herein by reference in its entirety.

BACKGROUND

1. Field

The present disclosure relates to an all-solid secondary battery and a method of manufacturing the same.

2. Description of the Related Art

An all-solid secondary battery may be manufactured by stacking electrode layers (anode layer and cathode layer) and a solid electrolyte layer therebetween, and pressing the stacked layers using a warm isostatic press to obtain a large-capacity all-solid secondary battery. However, such a method of manufacturing an all-solid secondary battery is not suitable for mass production, and the formation of a close interface between each of the electrode layers and the solid electrolyte layer may be difficult.

Therefore, there is still a need to develop an improved all-solid secondary battery and an improved method of manufacturing such an all-solid secondary battery.

SUMMARY

Provided is an all-solid secondary battery.

Provided is a method of manufacturing the all-solid secondary battery.

Additional aspects will be set forth in part in the description which follows and, in part, will be apparent from the description, or may be learned by practice of the presented embodiments.

According to an aspect of an embodiment, an all-solid secondary battery includes an anode layer; a cathode layer; a solid electrolyte layer interposed between the anode layer and the cathode layer, and including a first electrolyte; and a first bonding layer disposed between the cathode layer and the solid electrolyte layer, and comprising a second solid electrolyte, wherein the anode layer includes an anode current collector and an anode active material layer disposed on the anode current collector, and the anode active material layer includes a binder and an anode active material, wherein the cathode layer includes a cathode current collector and a cathode active material layer disposed on the cathode current collector, and the second solid electrolyte has a Young's modulus which is less than a Young's modulus of the first solid electrolyte.

According to an aspect of another embodiment, a method of manufacturing an all-solid secondary battery includes: providing a cathode layer; compressing the cathode layer to form a compressed cathode layer; providing an anode layer; providing a solid electrolyte layer; disposing the anode layer on the solid electrolyte layer to form a stack; compressing the stack form a compressed anode-electrolyte layer; and interposing a first bonding layer between the compressed cathode layer and the compressed anode-electrolyte layer.

According to an aspect of another embodiment, a method of manufacturing an all-solid secondary battery includes: providing a cathode layer; disposing a first bonding layer on a surface of the cathode layer to form a cathode comprising a first bonding layer; providing an anode layer; providing a solid electrolyte layer; disposing the anode layer on the solid electrolyte layer to form a stack; compressing the stack to form a compressed anode-electrolyte layer; stacking the cathode comprising the first bonding layer on the compressed anode-electrolyte layer; and compressing the cathode comprising the first bonding layer and the compressed anode-electrolyte layer to form the all-solid secondary battery.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
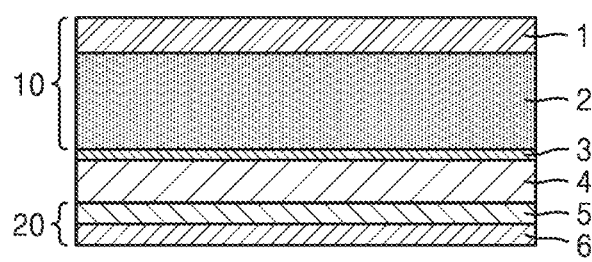
FIGS. 1A to 1E are cross-sectional views illustrating various embodiments of the structure of an all-solid secondary battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, spatially relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "combination" includes a mixture, an alloy, a reaction product, and the like unless otherwise stated. Throughout the specification, terms "first", "second", and the like are used to distinguish one component from another, without indicating order, quantity, or importance. An expression used in the singular encompasses the expression of the plural, unless otherwise indicated or it has a clearly different meaning in the context. The term "or" refers to "and/or" unless otherwise stated. As used herein, the terms "an embodiment", "embodiments", and the like indicate that elements described with regard to an embodiment are included in at least one embodiment described in this specification and may or may not present in other embodiments. In addition, it may be understood that the described elements are combined in any suitable manner in various embodiments. Unless otherwise defined, technical and scientific terms used herein have the same meaning as commonly understood by one or ordinary skill in the art to which this application belongs. All patents, patent applications, and other cited references are incorporated herein by reference in their entirety. However, in the event of any conflict or inconsistency between terms used herein and terms of the cited references, the terms used in this specification take precedence over the terms of the cited references. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modification, variations, improvements, and substantial equivalents.

The C rate is a discharge rate of a cell, and is obtained by dividing a total capacity of the cell by a total discharge period of time of 1 hour, e.g., a C rate for a battery having a discharge capacity of 1.6 ampere-hours would be 1.6 amperes.

An all-solid secondary battery may be manufactured by stacking an anode layer, a cathode layer, and a solid electrolyte layer in a pouch cell and applying pressure thereto in a vacuum-sealed state to improve battery performance. The pressure may be applied using, for example, a warm isostatic press. However, the manufacture of an all-solid secondary battery using the warm isostatic press is not suitable for mass production due to a long compression time and a small volume of the compression tank. Therefore, a roll press or a hot press may be used for mass production of the all-solid secondary battery. However, when the roll press or a hot press is used, the pouch cell may be deformed. Also, due to differences in the composition and physical properties between the anode layer, the cathode layer, and the solid electrolyte layer, there are differences in the conditions used to apply pressure to each of the layers, thereby making it difficult to simultaneously compress all of the layers. Meanwhile, when a cell is formed by separately pressing each of the electrode layers and the solid electrolyte layer, it may be difficult to form a close interface therebetween.

The present inventors have advantageously discovered a novel all-solid secondary battery and a method of manufacturing the same.

FIGS. 1A to 1E are cross-sectional views illustrating an embodiment of a structure of an all-solid secondary battery.

As illustrated in FIG. 1A, an all-solid secondary battery according to an embodiment includes: an anode layer 20; a cathode layer 10; and a solid electrolyte layer 4 interposed between the anode layer 20 and the cathode layer 10. The solid electrolyte layer includes a first solid electrolyte. The anode layer includes an anode current collector 6 and an anode active material layer 5 disposed on the anode current collector 6, and the anode active material layer 5 includes a binder and an anode active material. The anode active material does not include an alkali metal. The cathode layer 10 includes a cathode current collector 1 and a cathode active material layer 2 disposed on the cathode current collector 1. The all-solid secondary battery also includes a first bonding layer 3 disposed between the cathode active material layer 2 and the solid electrolyte layer 4, and the first bonding layer 3 includes a second solid electrolyte having a Young's modulus which is less than the Young's modulus of the solid electrolyte of the solid electrolyte layer 4.

The all-solid secondary battery may include the first bonding layer 3 including the second solid electrolyte having a Young's modulus which is at least 5 gigpascals (GPa) less than the Young's modulus of the solid electrolyte of the solid electrolyte layer 4, and disposed between the cathode active material layer 2 of the cathode layer and the solid electrolyte layer 4. For example, the Young's modulus of the second solid electrolyte may be about 5 GPa less than, or about 6 GPa less than, or about 8 GPa less than, or about 10 GPa less than the Young's modulus of the first electrolyte of the electrolyte layer. In an embodiment, the Young's modulus of the second solid electrolyte may be about 1 GPa to about 10 GPa less than, or about 3 GPa to about 10 GPa less than, or about 5 GPa to about 10 GPa less than the Young's modulus of the first electrolyte of the electrolyte layer. The first bonding layer 3 may include a solid electrolyte which is relatively "softer" than the solid electrolyte of the solid electrolyte layer 4. The solid electrolyte includes a powder (particulate) material, and thus the Young's modulus of the solid electrolyte may also be referred to herein as a "powder modulus," e.g., the Young's modulus (elastic modulus) of a powder material. The Young's modulus (elastic modulus) of the powder material of the solid electrolyte is determined by analyzing a nanoindentation load-displacement curve obtained using a nano-indenter. The Young's modulus (elastic modulus) of a powder modulus of the powder material of the solid electrolyte can be varied depending on the type of the electrolyte such as powder-type, pellet-type or sheet-type. When the all-solid secondary battery is manufactured by disposing the first bonding layer 3 as described above and applying pressure to the layers using a roll press or a hot press, a close interface may be formed between the cathode layer 10 and the solid electrolyte layer 4. The all-solid secondary battery may have improved battery performance such as rate properties and lifespan characteristics as well as a reduced interfacial resistance between the cathode layer and the solid electrolyte layer 4.

For example, the first bonding layer 3 may be interposed between the cathode active material layer 2 of the cathode layer 10 and the solid electrolyte layer 4. For example, the first bonding layer 3 may be disposed in contact with a surface of the cathode active material layer 2 of the cathode layer 10. The first bonding layer 3 disposed in contact with the cathode active material layer 2 may be formed by coating the first bonding layer 3 directly onto a surface of the cathode active material layer 2 of the cathode layer 10, or by separately forming the first bonding layer 3 and transferring it to a surface of the cathode active material layer 2.

The first bonding layer 3 may include a sulfide-based solid electrolyte represented by Formula 1 below.

                                                                Formula 1

In Formula 1,
$0<a\leq6$, $0\leq b\leq6$, $0<c<6$, and $0\leq d\leq6$;
M may be Ge, Sn, or Si; and
A may be one or more halogen elements.

The solid electrolyte represented by Formula 1 above has an ionic conductivity which is similar to the ionic conductivity of a liquid electrolyte, which is, for example, in the range of about $10^{-2}$ Siemens per centimeter (S/cm) to about $10^{-3}$ S/cm as measured at room temperature. As a result, a close interface may be formed between the cathode layer 10 and the solid electrolyte layer 4 without causing a reduction in ionic conductivity. In addition, an all-solid secondary battery including the solid electrolyte represented by Formula 1 may have excellent battery performance such as rate properties and lifespan characteristics.

The first bonding layer 3 may include the solid electrolyte represented by Formula 1 and may further include $Li_2S$—$P_2S_5$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (where m and n are positive numbers and Z is Ge, Zn, Ga, or a combination thereof), $Li_2S$—$GeS_2$, $Li_2S$—$SiS_2$—$Li_3PO_4$, $Li_2S$—$SiS_2$—$Li_pMO_q$ (where p and q are independently, from 1 to 4, and M is P, Si, Ge, B, Al, Ga, In, or a combination thereof), $Li_7P_3S_{11}$, $Li_7P_{1.4}S_{11}$, $Li_{10}GeP_2S_{12}$, or a combination thereof.

The first bonding layer 3 may include an amorphous solid electrolyte, a crystalline solid electrolyte, or a combination thereof. For example, the first bonding layer 3 may include a mixed solid electrolyte including both a crystalline solid electrolyte and an amorphous solid electrolyte. For example, the first bonding layer 3 may include a crystalline solid electrolyte.

The solid electrolyte of the first bonding layer 3 may be in the form of a particle having D50 particle diameter of about 3 micrometers (μm) or less, or about 2.5 μm or less, or about 2 μm or less. For example, the solid electrolyte of the first bonding layer 3 may have a D50 particle diameter of about 0.01 μm to about 3 μm, or about 0.05 μm to about 3 μm, or about 0.05 μm to about 3 μm. As used herein, the term "D50 particle diameter" refers to a particle diameter corresponding to 50% of the particles in a cumulative distribution curve in which particles are accumulated in the order of particle diameter from the smallest particle to the largest particle and a total number of accumulated particles is 100%. Similarly, the terms "D10" and "D95" respectively indicate particle diameters corresponding to 10%, and 95% of the particles in the cumulative distribution curve of the solid electrolyte particles, respectively.

The D10, D50, and D95 particle diameters may be measured by any suitable method. For example, a particle size analyzer or an image from a transmission electron microscopic (TEM) or scanning electron microscopic (SEM) may be used. Alternatively, the D10, D50, and D95 particle diameters may be obtained by measuring particle diameter by dynamic light-scattering, counting the number of particles belonging to each particle diameter range, and calculating the results.

The first bonding layer 3 may have a thickness of about 30 μm or less. For example, the first bonding layer 3 may have a thickness of about 10 μm or less, or about 5 μm or less. The first bonding layer 3 having a thickness within the range described above may form a close interface between the cathode layer and the solid electrolyte layer 4 without deteriorating battery performance.

The solid electrolyte of the solid electrolyte layer 4 may include $Li_2S$—$P_2S_5$, $Li_2S$—$P_2S_5$—LiX (where X is a halogen atom), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are positive numbers and Z is Ge, Zn, Ga, or a combination thereof), $Li_2S$—$GeS_2$, $Li_2S$—$SiS_2$—$Li_3PO_4$, $Li_2S$—$SiS_2$—$Li_pMO_q$ (where p and q are independently, from 1 to 4 and M is P, Si, Ge, B, Al, Ga, In, or a combination thereof), $Li_xM'_yPS_zA_w$ (where x, y, z, and w are numbers from 0 to 6, M' is Ge, Sn, or Si, and A is F, Cl, Br, or I). A combination comprising at least two of the foregoing may also be used.

The solid electrolyte of the solid electrolyte layer 4 may be a sulfide-based solid electrolyte having a composition identical to or different from that of the solid electrolyte of the first bonding layer 3. For example, the solid electrolyte of the solid electrolyte layer 4 may be a sulfide-based solid electrolyte having the same composition as that of the solid electrolyte of the first bonding layer 3.

The solid electrolyte of the solid electrolyte layer 4 may be in the form of a particle and may have a D50 particle diameter of about 1 μm to about 3.5 μm. For example, the solid electrolyte of the solid electrolyte layer 4 may have an average particle diameter D50 of about 1 μm to about 3.4 μm, or about 1 μm to about 3.2 μm, or about 1 μm to about 3.1 μm. For example, the solid electrolyte of the solid electrolyte layer 4 may have a D10 particle diameter of about 0.1 μm to about 2.0 μm, or about 0.1 μm to about 1.8 μm, or about 0.2 μm to about 1.5 μm. For example, the solid electrolyte of the solid electrolyte layer 4 may have a D95 particle diameter of about 7.0 μm to about 11.0 μm, or about 7 μm to about 10 μm, or about 8 μm to about 10 μm. Definitions of the D10, D50, and D95 particle diameters of the solid electrolyte of the solid electrolyte layer (e.g., first solid electrolyte) and a method of measuring the same are as described above, and thus a detailed description thereof will not be repeated.

The solid electrolyte of the solid electrolyte layer may be prepared by melt quenching or mechanical milling a starting material (such as $Li_2S$ and $P_2S_5$) and heat-treating the resultant. The solid electrolyte of the solid electrolyte layer may be crystalline, amorphous, or a combination of crystalline and amorphous states. For example, the solid electrolyte of the solid electrolyte layer may be a crystalline solid electrolyte.

When $Li_2S$—$P_2S_5$ is used as the sulfide-based solid electrolyte material to form the solid electrolyte, a mixed molar ratio of $Li_2S$ to $P_2S_5$, may be, for example, from about 50:50 to about 90:10, or about 60:40 to about 90:10, or about 75:25 to about 90:10. The solid electrolyte layer may further include a binder. Examples of the binder included in the solid electrolyte layer may include styrene butadiene rubber (SBR), polytetrafluoroethylene (PTFE), polyvinylidene fluoride (PVDF), polyethylene (PE), polymethacrylate (PMA), polyacrylic acid (PAA), or a combination thereof. The binder of the solid electrolyte layer 4 may be the same as or different from the binder of the cathode active material layer 2 and/or the anode active material layer 5.

The solid electrolyte layer 4 may have a thickness of about 10 μm to about 150 μm or about 15 μm to about 125 μm, or about 20 μm to about 100 μm.

Figure 1B:
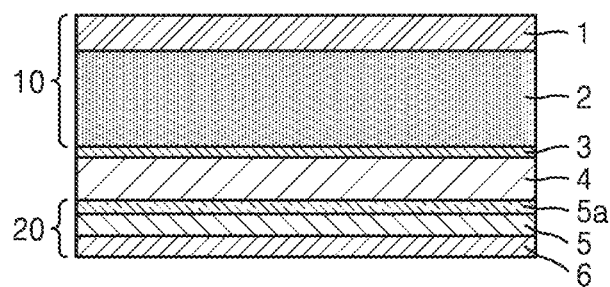

As illustrated in FIG. 1B, the all-solid secondary battery according to an embodiment may include a second bonding layer 5a disposed in contact with a surface of the solid electrolyte layer 4 facing the anode active material layer 5 of the anode layer 20. The second bonding layer 5a may include a solid electrolyte having a Young's modulus less than the Young's modulus of the solid electrolyte of the solid electrolyte layer. Since the all-solid secondary battery is manufactured by interposing the second bonding layer 5a between the anode layer 20 and the solid electrolyte layer 4 and compressing the layers (e.g., using a roll press or a hot press), an adhesive force between the layers may be increased by applying a relatively low pressure, and a close interface may be formed between the anode layer 20 and the solid electrolyte layer 4. Also, since the second bonding layer 5a may have a high ionic conductivity at room temperature, the all-solid secondary battery including the same may have improved battery performance. For example, the all-solid secondary battery may have improved rate properties and lifespan characteristics in addition to reduced interfacial resistance between the anode layer and the solid electrolyte layer, as well as a reduced interfacial resistance between the cathode layer and the solid electrolyte layer.

The second bonding layer 5a may include an amorphous sulfide-based solid electrolyte. The second bonding layer 5a may include a sulfide-based solid electrolyte having a composition identical to or different from the solid electrolyte of the first bonding layer 3. For example, the second bonding layer 5a may include $Li_2S$—$P_2S_5$—LiX (where X is a halogen atom), $Li_7P_3S_{111}$, $Li_7P_{1.4}S_{11}$, $Li_{10}GeP_2S_{12}$, or a combination thereof.

The second bonding layer 5a may also be disposed between the cathode active material layer 2 of the cathode layer 10 and the solid electrolyte layer 4 together with the first bonding layer 3 or instead of the first bonding layer 3.

The solid electrolyte layer 4 may further include an alkali metal salt and/or an ionic liquid. For example, the solid electrolyte layer 4 may further include a lithium salt and/or an ionic liquid.

An amount of the lithium salt contained in the solid electrolyte layer may be about 1 molar (M) or greater, or about 2 M or greater, or about 3 M or greater. For example, the amount of the lithium salt contained in the solid electrolyte layer 4 may be from about 1 M to about 4 M, or about 1 M to about 3 M or about 1 M to about 2 M. When the amount of the lithium salt is within the ranges described above, the mobility of lithium ions may be increased in the solid electrolyte layer 4, thereby improving ionic conductivity.

The lithium salt may include LiSCN, $LiN(CN)_2$, $Li(CF_3SO_2)_3C$, $LiC_4F_9SO_3$, $LiN(SO_2CF_2CF_3)_2$, LiCl, LiF, LiBr, LiI, $LiB(C_2O_4)_2$ (lithium bis(oxalato) borate, LiBOB), $LiBF_4$, $LiBF_3(C_2F_5)$, lithium oxalyldifluoro borate (LIODFB, lithium difluoro(oxalato) borate, LiDFOB), lithium bis(trifluoro methanesulfonyl)imide (LiTFSI, $LiN(SO_2CF_3)_2$), lithium bis(fluorosulfonyl)imide (LiFSI, $LiN(SO_2F)_2$), $LiCF_3SO_3$, $LiAsF_6$, $LiSbF_6$, $LiClO_4$, or a combination thereof. For example, the lithium salt may be an imide-based lithium salt. Examples of the imide-based lithium salt may include lithium bis(trifluoro methanesulfonyl)imide (LiTFSI, $LiN(SO_2CF_3)_2$), lithium bis(fluorosulfonyl)imide (LiFSI, $LiN(SO_2F)_2$), or a combination thereof. Without being limited by theory, it is understood that the lithium salt may maintain or improve ionic conductivity by appropriately maintaining chemical reactivity of the ionic liquid.

A weight ratio of the first solid electrolyte to the ionic liquid in the solid electrolyte layer may be from about 0.1:99.9 to about 90:10. For example, the weight ratio of the first solid electrolyte to the ionic liquid in the solid electrolyte layer may be from about 10:90 to about 90:10. For example, the weight ratio of the first solid electrolyte to the ionic liquid in the solid electrolyte layer may be from about 20:80 to about 90:10. For example, the weight ratio of the first solid electrolyte to the ionic liquid in the solid electrolyte layer may be from about 30:70 to about 90:10. For example, the weight ratio of the first solid electrolyte to the ionic liquid in the solid electrolyte layer may be from about 40:60 to about 90:10. For example, the weight ratio of the first solid electrolyte to the ionic liquid in the solid electrolyte layer may be from about 50:50 to about 90:10. The solid electrolyte layer having a weight ratio of the first solid electrolyte to the ionic liquid within the above-described ranges may maintain or improve ionic conductivity by increasing an electrochemical contact area with an electrode. A battery including the solid electrolyte layer may have increased energy density and discharge capacity and/or improved rate properties.

The cathode layer 10 may include the cathode current collector 1 and the cathode active material layer 2 disposed on the cathode current collector 1.

The cathode current collector 1 may include indium (In), copper (Cu), magnesium (Mg), stainless steel, titanium (Ti), iron (Fe), cobalt (Co), nickel (Ni), zinc (Zn), aluminum (Al), germanium (Ge), lithium (Li), an alloy thereof, or a combination thereof, and may be in the form of plate or foil. The cathode current collector 1 may be omitted.

The cathode active material layer 2 may include a cathode active material and a solid electrolyte. The solid electrolyte included in the cathode active material layer 2 may be the same as or different from the first, second, and third solid electrolyte included in the solid electrolyte layer 4, the first bonding layer 3, and/or the second bonding layer 5a, respectively.

The cathode active material may be a compound allowing incorporation/deincorporation of an alkali metal, such as, lithium.

Examples of the compound allowing incorporation/deincorporation of lithium include at least one of the compounds represented by the following formulae: $Li_aA_{1-b}B'_bD'_2$ (where $0.90 \leq a \leq 1.8$ and $0 \leq b \leq 0.5$); $Li_aE_{1-b}B'_{2-c}D'_c$ (where $0.90 \leq a \leq 1.8$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1.8$, $0 \leq b \leq 0.05$, and $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, qne $0 \leq c \leq 0.05$, and $0 < \alpha < 2$); $Li_aNi_{1-b-c}Mn_bB'_cD'_\alpha$ (where $0.90 \leq a \leq 1.8$, $0 \leq b \leq 0.05$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.05$, $0 \leq c \leq 0.05$, and $0 < \alpha < 2$); $Li_aNi_bE_cG_dO_2$ (where $0.90 \leq a \leq 1.8$, $0 \leq b \leq 0.09$, $0 \leq c \leq 0.05$, and $0.001 \leq d \leq 0.1$); $Li_aNi_bCo_cMn_{d-}G_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae, A is Ni, Co, Mn, or a combination thereof; B' is Al, Ni, Co, Mn, Cr, Fe, Mg, Sr, V, a rare earth element, or a combination thereof; D' is O, F, S, P, or any combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof.

The compound may have a coating layer on the surface of thereof, or a mixture of the afore-mentioned compound and a compound having a coating layer may be used. The coating layer may include a compound of a coating element such as an oxide, hydroxide, oxyhydroxide, oxycarbonate, or hydroxycarbonate of the coating element. The compound constituting the coating layer may be amorphous or crystalline. Examples of the coating element included in the coating layer may include Mg, Al, Co, K, Na, Ca, Si, Ti, V, Sn, Ge, Ga, B, As, Zr, or mixture combination thereof. The coating layer may be formed by using any suitable coating method, which does not adversely affect the physical properties of the cathode active material (e.g., spray coating and immersion). The coating method is known to those of skill in the art, and thus a detailed description thereof is not provided herein.

For example, the cathode active material may be a ternary lithium transition metal oxide having a layered rock-salt type structure such as $LiNi_xCo_yAl_zO_2$ (NCA) or $LiNi_xCo_yMn_zO_2$ (NCM) (wherein in $LiNi_xCo_yAl_zO_2$ and $LiNi_xCo_yMn_zO_2$, x, y, and z are independently $0<x<1$, $0<y<1$, and $0<z<1$, where $x+y+z=1$). The ternary lithium transition metal oxide having the layered rock-salt type structure may increase energy density and improve thermal stability of the all-solid secondary battery.

The cathode active material may also be a nickel-based composite oxide including about 60 weight percent (wt %) or greater, or about 75 wt % or greater, or about 90 wt % or greater, of nickel such as lithium nickel cobalt manganese oxide or lithium nickel cobalt aluminum oxide. Theses nickel-containing cathode active materials may have ionic conductivity since resistive elements are not generated between particles of the sulfide-based solid electrolyte.

The cathode active material may also be a lithium cobalt oxide having a high true density and a high diffusion velocity of lithium ions in addition to the nickel-based composite oxide. For example, the cathode active material may be a composite cathode active material prepared by coating the lithium cobalt oxide with a nickel-based composite oxide, $LiNbO_2$, $Li_4Ti_5O_{12}$, an aluminum oxide, or a combination thereof.

The cathode active material may include a particle having a spherical shape, an elliptical shape, or a combination thereof. The particle diameter of the cathode active material is not particularly limited and may be within a range suitable for use in an all-solid secondary battery. Also, the amount of the cathode active material included in the cathode layer is not particularly limited and may be within a range suitable for a cathode layer of an all-solid secondary battery.

The cathode layer may further include an additive such as a conductive agent, a binder, a filler, a dispersant, an ion-conductive adjuvant, or a combination thereof. The additives may be appropriately selected, in addition to the cathode active material and the solid electrolyte.

For example, the conductive agent added to the cathode layer may include graphite, carbon black, acetylene black, Ketjen black, a carbon fiber, a metal powder, or a combination thereof. For example, the binder added to the cathode layer may include styrene-butadiene rubber (SBR), polytetrafluoroethylene, polyvinylidene fluoride, polyethylene, or a combination thereof. Any coating agent, dispersant, or ion-conductive adjuvant suitable for use in an electrode for an all-solid secondary battery may be added to the cathode layer.

The anode layer 20 may include the anode current collector 6 and the anode active material layer 5 disposed on the anode current collector 6.

The anode active material layer 5 may include a binder and an anode active material. In some embodiments, the anode active material does not include an alkali metal. The anode active material layer 5 may be a layer which is free of an alkali metal, for example, a layer in which an alkali metal is not deposited during charge of the all-solid secondary battery or a layer which does not include an alkali metal prior to charge of the all-solid secondary battery. For example, the alkali metal may include lithium, sodium, potassium, or the like.

The anode current collector may include a material which does not react with, i.e., does not form an alloy or a compound, with an alkali metal, such as, lithium metal. Examples of the material constituting the anode current collector may include copper (Cu), stainless steel, titanium (Ti), iron (Fe), cobalt (Co), nickel (Ni), or a combination thereof. The anode current collector may be formed of an alloy or a coating material including one or more metals selected from the above-mentioned metals. For example, the anode current collector may be formed as a plate shape or a foil shape.

The anode active material may include amorphous carbon, gold, platinum, palladium, silicon, silver, aluminum, bismuth, tin, zinc, or a combination thereof. The anode active material may include amorphous carbon and may further include gold, platinum, palladium, silicon, silver, aluminum, bismuth, tin, zinc, or a combination thereof. Examples of the amorphous carbon may include carbon black (CB), acetylene black (AB), furnace black (FB), Ketjen black (KB), graphene, or a combination thereof. A mixing weight ratio of amorphous carbon to gold may be from about 10:1 to about 1:2, or about 8:1 to about 1:2 or about 5:1 to about 1:1. When the anode active material is formed of these materials, battery performance of the all-solid secondary battery such as rate properties and lifespan characteristics may further be improved.

The gold, platinum, palladium, silicon, silver, aluminum, bismuth, tin, zinc, or a combination thereof used as the anode active material may have a particulate shape and an D50 particle diameter of 4 µm or less, or 1 µm or less, or 0.5 µm or less. A lower limit of the D50 particle diameter of the anode active material may be about 10 nanometers (nm). Definitions of the D50 particle diameter of the anode active material and methods of measuring the same are as described above, and thus a detailed description will not be repeated. An all-solid secondary battery including the anode active material having the D50 particle diameter within the ranges described above, may have improved battery performance such as rate properties and lifespan characteristics.

The anode active material may include a mixture of amorphous first particles and crystalline second particles of a metal or semiconductor material. Examples of the metal or semiconductor material may include gold, platinum, palladium, silicon, silver, aluminum, bismuth, tin, zinc, or a combination thereof. An amount of the second particles may be from about 8 wt % to about 60 wt %, for example, from about 10 wt % to about 50 wt %, or about 15 wt % to about 45 wt %, based on a total weight of the anode active material. In this case, battery performance of the all-solid secondary battery such as rate properties and lifespan characteristics may be further improved.

When the anode active material layer 5 includes a binder, the anode active material layer 5 may be stabilized on the anode current collector 6. For example, when the anode active material layer 5 does not include a binder, the anode active material layer 5 may easily be separated from the anode current collector 6. Since the anode current collector 6 is exposed when a portion of the anode active material layer 5 is separated therefrom, a short-circuit may occur. The anode active material layer 5 may be formed by coating a slurry, in which a material constituting the anode active material layer 5 is dispersed, onto the anode current collector 6 and drying the coated slurry. By adding the binder to the anode active material layer 5, the anode active material may stably be dispersed in the slurry. As a result, when the slurry is coated on the anode current collector 6, for example, by screen printing, clogging of the screen (for example, clogging by an aggregate of the anode active material) may be prevented.

When the anode active material layer includes the binder, an amount of the binder may be in the range of about 0.3 wt % to about 15 wt %, or about 1 wt % to about 12.5 wt %, or about 2 wt % to about 10 wt %, based on a total weight of the anode active material. When the amount of the binder is less than 0.3 wt %, the strength of the anode active material layer may not be sufficient, characteristics of the anode active material layer may deteriorate, and it may be difficult to treat/handle the anode active material layer. When the amount of the binder is greater than 15 wt %, performance of the all-solid secondary battery may deteriorate.

Although a thickness of the anode active material layer is not particularly limited, the thickness may be from about 1 µm to about 20 µm, or about 2 µm to about 18 µm, or about 5 µm to about 15 µm, without being limited thereto. When the thickness of the anode active material layer is less than 1 µm, performance of the all-solid secondary battery may not be sufficiently improved. When the thickness of the anode active material layer is greater than 20 µm, performance of the all-solid secondary battery may not be sufficiently improved due to a high resistance of the anode active material layer. By using the afore-mentioned binder, the thickness of the anode active material layer may be modified to an appropriate level.

An additive such as a filler, a dispersant, an ion-conductive adjuvant, or a combination thereof, which is suitable for use in an all-solid secondary battery may be included in the anode active material layer. The filler, the dispersant, and/or the ion-conductive adjuvant may be the same as or different from those used in the cathode active material layer.

Figure 1C:
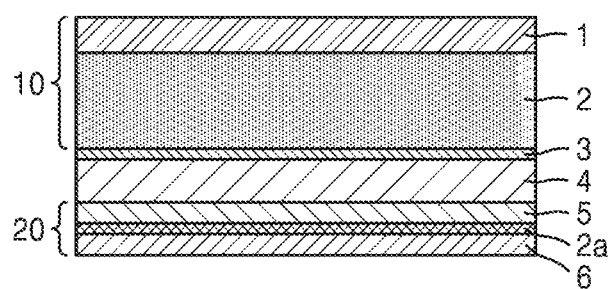

As illustrated in FIG. 1C, the all-solid secondary battery may include an alkali metal deposit layer 2a in an area between an anode current collector and an anode active material layer during charging. The alkali metal deposited layer 2a may be a lithium metal deposit layer, a sodium metal deposit layer, or a potassium metal deposit layer. For example, the alkali metal deposit layer may be a lithium metal deposit layer.

During an initial stage of charging, an alkali metal, for example, lithium metal, is inserted into the anode active material layer 5 of the all-solid secondary battery. The anode active material may form an alloy or compound with a lithium ion moving from the cathode layer. When the battery is overcharged and exceeds the capacity of the anode active material layer 5, lithium is precipitated on a lower surface of the anode active material layer 5, i.e., between the anode current collector 6 and the anode active material layer 5, as illustrated in FIG. 1C, and an alkali metal (e.g., Li) deposit layer 2a is formed. This phenomenon may occur when the anode active material includes a material capable of forming an alloy or compound with lithium even though the anode active material itself does not include lithium metal. During discharge, lithium from the anode active material layer 5 and the lithium metal deposit layer 2a is ionized and moves toward the cathode layer. Thus, lithium may be used as an anode active material in the all-solid secondary battery. Also, since the anode active material layer 5 is disposed on, and covers the lithium metal deposit layer 2a, the anode active material layer 5 may prevent dendrites from growing thereby simultaneously protecting the lithium metal deposit layer 2a. As a result, a short-circuit in, and a decrease in capacity of the all-solid secondary battery may be prevented, and performance of the all-solid secondary battery may be improved.

For example, in the all-solid secondary battery, a ratio of a charge capacity of the anode active material layer 5 to a charge capacity of the cathode active material layer 2, i.e., a capacity ratio, may satisfy the equation of Inequality 1 below.

$$0.002 < b'/a' < 0.5 \quad \text{Inequality 1:}$$

a': charge capacity (milliampere-hour, mAh) of the cathode active material layer 2 b': charge capacity (mAh) of the anode active material layer 5

In this regard, the charge capacity of the cathode active material layer 2 is obtained by multiplying a charge specific capacity (milliampere hours per gram, mAh/g) of the cathode active material by a mass (g) of the cathode active material of the cathode active material layer 2. When various types of cathode active materials are used, the charge specific capacity multiplied by the mass of the cathode active materials are respectively calculated and a sum of the values is regarded as the charge capacity of the cathode active material layer 2. The charge specific capacity of the anode active material layer 5 is calculated in the same manner. That is, the charge capacity of the anode active material layer 5 is obtained by multiplying a charge specific capacity (mAh/g) of the anode active material by a mass of the anode active material of the anode active material layer 5. When various types of anode active materials are used, charge specific capacity multiplied by the mass of the anode active materials are respectively calculated and a sum of the values is regarded as the charge capacity of the anode active material layer 5. In this case, the charge specific capacity of the cathode active material and the anode active material are capacities estimated using all-solid half-cells to which lithium metal is applied as a counter electrode. The charge capacities of the cathode active material layer 2 and the anode active material layer 5 are directly measured using the all-solid half-cells. The charge specific capacity is calculated by dividing the charge capacity by the mass of each active material. The charge capacity of the cathode active material layer 2 and the anode active material layer 5 may be an initial charge capacity measured during charging in a first cycle.

Figure 1D:
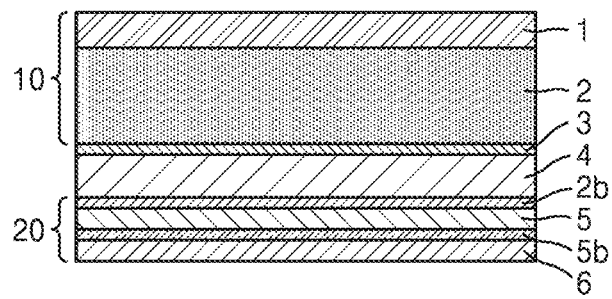

As shown in FIG. 1D, the all-solid secondary battery may further include a thin film 5b including a material capable of forming an alloy or compound with an alkali metal, and which is disposed on the anode current collector 6. The thin film 5b may be interposed between the anode current collector 6 and the anode active material layer 5.

Although not reacting with an alkali metal, the anode current collector 6 may make deposition of a smooth alkali metal layer, e.g., without protrusions, such as a lithium metal layer, thereon difficult. The thin film 5b may be used as a wetting layer to assist the alkali metal, such as lithium metal, to be deposited as a flat layer on the anode current collector 6.

The material capable of forming an alloy with the alkali metal and used to form the thin film 5b may include silicon, magnesium, aluminum, lead, silver, tin, or a combination thereof. The material capable of forming a compound with the alkali metal and used to form the thin film 5b may include carbon, titanium sulfide, iron sulfide, or a combination thereof. An amount of the material used to form the thin film 5b may be within a narrow range which does not affect the electrochemical properties and/or reduction/oxidation potentials of the electrodes. The thin film 5b may be applied onto the anode current collector 6 to prevent cracks from occurring during charging cycles of the all-solid secondary battery, and may be a relatively flat film. The application of the thin film 5b may be performed by physical vapor deposition such as evaporation or sputtering, chemical deposition, or plating.

The thin film 5b may have a thickness of about 1 nm to about 500 nm. For example, the thin film 5b may have a thickness of about 2 nm to about 400 nm. For example, the thin film 5b may have a thickness of about 3 nm to about 300 nm. For example, the thin film 5b may have a thickness of about 4 nm to about 200 nm. For example, the thin film 5b may have a thickness of about 5 nm to about 100 nm.

As illustrated in FIG. 1D, the all-solid secondary battery may include an alkali metal deposit layer, such as a lithium metal deposit layer 2b. The alkali metal deposit layer may be formed in at least one of an area on the anode active material layer 5, an area between the anode active material layer 5 and the anode current collector 6, or a combination thereof, during charging of the all-solid secondary battery.

The anode active material includes amorphous carbon and silver, and the alkali metal deposited in the anode active material may form an alloy with silver during charge of the all-solid secondary battery.

Figure 1E:
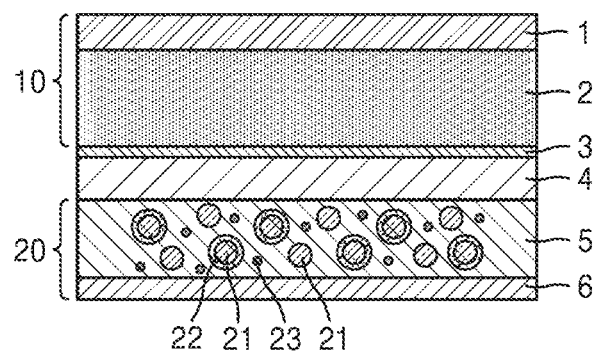

As shown in FIG. 1E, the all-solid secondary battery has a structure in which, during charge, a lithium metal layer 22 is formed on the surface of an anode active material 21 and amorphous carbon 23 is deposited in the anode active material layer 5. This is because the lithium metal deposited layer 22 is formed on the surface of the silicon anode active material 21 to form an alloy due to a large volume expansion rate of the silicon anode active material 21.

Figure 2:
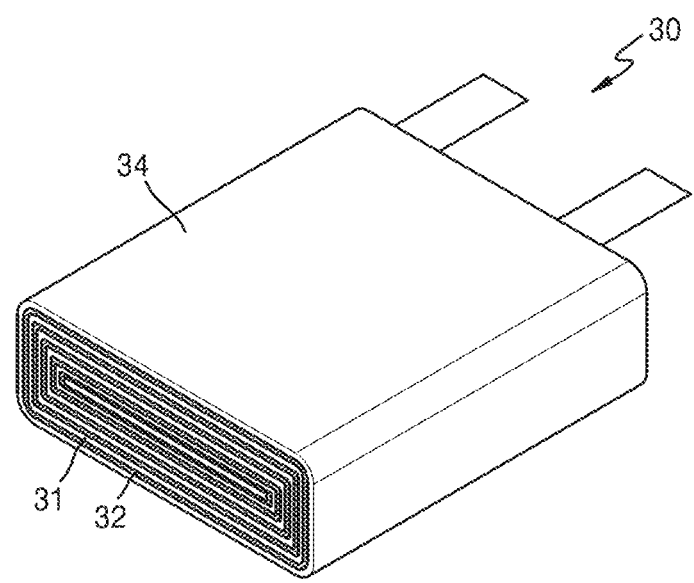
FIG. 2 is a schematic view illustrating a structure of an all-solid secondary battery according to an embodiment.

FIG. 2 is a schematic diagram illustrating a structure of an all-solid secondary battery 30, according to an embodiment.

As shown in FIG. 2, the all-solid secondary battery 30 includes a cathode 31, an anode 32, and a battery can 34 accommodating the cathode 31 and the anode 32.

The cathode 31 may be the afore-mentioned cathode layer. The cathode layer may be formed by coating a cathode active material on a surface of a cathode current collector (e.g., formed of aluminum, or the like). Alternatively, the cathode layer may be formed by casting/coating the cathode active material on a separate support and stacking a cathode active material film separated from the support on a current collector.

The anode 32 may be the afore-mentioned anode layer. The afore-mentioned solid electrolyte layer (not shown) may be interposed between the cathode 31 and the anode 32.

The all-solid secondary battery 30 may be in the form of a unit cell having a cathode/separator/anode structure, a bi-cell having a cathode/separator/anode/separator/cathode structure, or a stacked battery having a structure in which a unit cell is repeatedly stacked.

The shape of the all-solid secondary battery 30 is not particularly limited and may be, for example, a coin, button, sheet, stack, cylindrical, thin-film, or horn shape. Also, the all-solid secondary battery 30 may be applied to large-sized batteries, such as those used in electric vehicles, or the like. For example, the all-solid secondary battery 30 may be used in a hybrid vehicle such as a plug-in hybrid electric vehicle (PHEVs). Also, the all-solid secondary battery 30 may be used in applications utilizing a large amount of power storage. For example, the all-solid secondary battery 30 may be used in an electric bike (E-bikes) and an electric tool.

Figure 3:
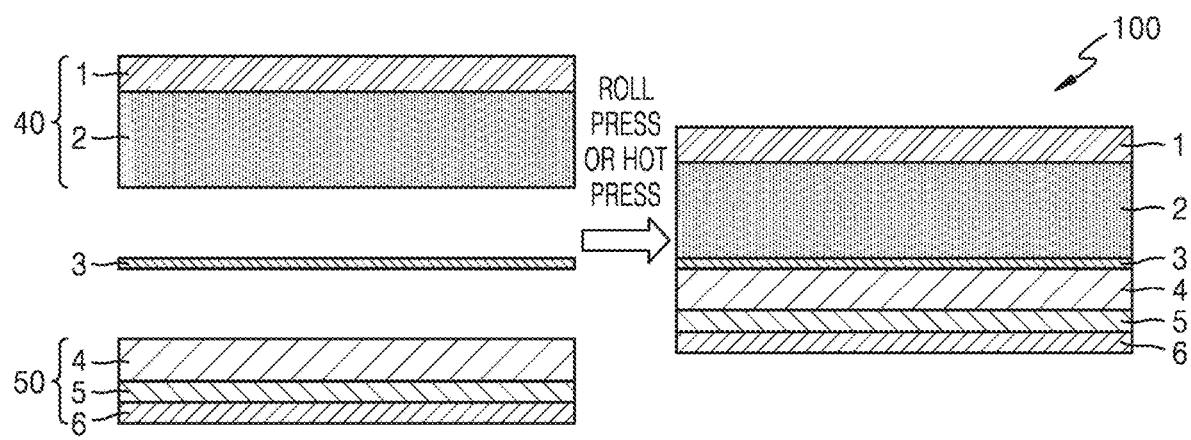
FIGS. 3 and 4 are schematic views illustrating different embodiments of a method of manufacturing an all-solid secondary battery.
Figure 4:
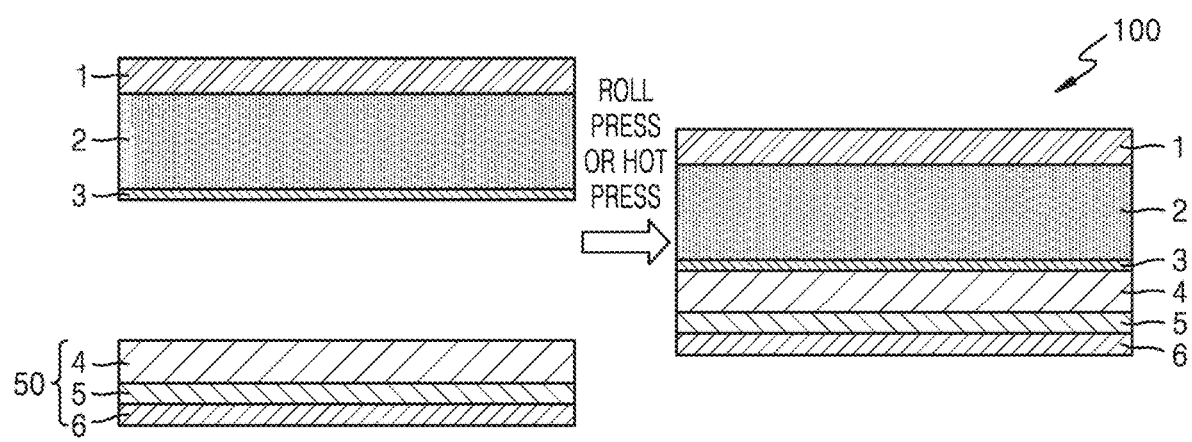

FIGS. 3 and 4 are schematic views illustrating methods of manufacturing an all-solid secondary battery according to various embodiments.

As shown in FIG. 3, a method of manufacturing an all-solid secondary battery 100 according to another embodiment includes: providing a cathode layer; compressing the cathode layer to form a compressed cathode layer 40; providing an anode layer; providing a solid electrolyte layer 4; disposing the anode layer on the solid electrolyte layer to form a stack; compressing the stack to form a compressed anode-electrolyte layer 50; and interposing a first bonding layer 3 between the compressed cathode layer 40 and the compressed anode-electrolyte layer 50 and applying pressure thereto. The cathode layer includes a cathode current collector 1 and a cathode active material layer 2, and the anode layer includes the anode current collector 6 and the cathode active material layer 5.

The compressing of the cathode layer, the compressing of the stack, and the compressing of the compressed cathode layer, the first bonding layer, and the compressed anode-electrolyte layer each independently comprise a roll press method, a hot press method, or a combination thereof.

Although a cathode or an anode including a solid electrolyte is not easily deformed after repeated rolling processes, the rolled solid electrolyte may become brittle and cannot be rolled repeatedly. Also, when the all-solid secondary battery is prepared by a roll press or a hot press, the rolling process needs to be repeated to increase the density of the electrode layers or the solid electrolyte layer. Thus, according to the method of preparing all-solid secondary battery in which the forming of the compressed cathode layer and the forming of the compressed stacked layer of the anode layer and the solid electrolyte layer are performed separately, a close interface between each of the electrode layers and the solid electrolyte layer may easily be formed by applying the pressure after stacking the layers. In addition, according to the method of preparing the all-solid secondary battery, battery performance such as rate properties and lifespan characteristics may be improved, while simultaneously reducing interfacial resistance between the cathode layer and the solid electrolyte layer.

As shown in FIG. 4, a method of manufacturing an all-solid secondary battery according to another embodiment includes: providing a cathode layer; disposing a first bonding layer on a surface of the cathode layer to form a cathode comprising a first bonding layer; providing an anode layer; providing a solid electrolyte layer; disposing the anode layer on the solid electrolyte layer to form a stack; compressing the stack to form a compressed anode-electrolyte layer; stacking the cathode comprising the first bonding layer on the compressed anode-electrolyte layer; and compressing the cathode comprising the first bonding layer and the compressed anode-electrolyte layer to form the all-solid secondary battery.

The forming of the cathode layer on which the first bonding layer 3 is disposed may further include a process of coating the first bonding layer 3 onto the surface of the cathode active material layer 2, or transferring the first bonding layer 3 onto the surface of the cathode active material layer 2. The all-solid secondary battery may be prepared by applying pressure thereto by a roll press or a hot press.

The above-described method of manufacturing the all-solid secondary battery are suitable for mass production and for the provision of a close interface between each of the electrode layers and the solid electrolyte layer. In addition, according to the described methods of manufacturing the all-solid secondary battery, battery performance such as rate properties and lifespan characteristics may be improved while simultaneously reducing interfacial resistance between the cathode layer and the solid electrolyte layer.

Hereinafter, the present disclosure will be described in more detail according to the following examples and comparative examples. However, the following examples are merely presented to exemplify the present disclosure, and the scope of the present disclosure is not limited thereto.

EXAMPLES

Preparation of all-Solid Secondary Battery

Example 1

Preparation of All-Solid Secondary Battery

An all-solid secondary battery was prepared under an argon gas atmosphere as follows.

$Li_2S$ powder (Sigma Aldrich, 99%), $P_2S_5$ powder (Sigma Aldrich, 99%), and LiCl powder (Acros Organic, 99%) were respectively weighed in a stoichiometric molar ratio to obtain a $Li_{5.75}PS_{4.75}Cl_{1.25}$ sulfide solid electrolyte and combined to prepare a mixture. The mixture was mechanically milled using zirconia balls (having a diameter of 10 millimeters (mm)) and then subjected to high energy ball milling at a rotation speed of 600 rotations per minute (rpm) for about 45 hours to obtain a pulverized mixture. The pulverized mixture was stirred in anhydrous ethanol (Wako, 99.5%) at room temperature for 24 hours to obtain a homogeneous dark brown mixture. The mixture was dried in a vacuum at 80° C. for 3 hours and pulverized to obtain a cathode layer-forming $Li_{5.75}PS_{4.75}Cl_{1.25}$ sulfide solid electrolyte powder (D50: 0.5 μm). Also, first bonding layer-forming $Li_{5.5}PS_{4.5}Br_{0.75}Cl_{0.75}$ sulfide solid electrolyte powder (D50: 3 μm) was prepared in the same manner except that $Li_2S$ powder (Sigma Aldrich, 99%), $P_2S_5$ powder (Sigma Aldrich, 99%), and LiCl powder (Acros Organic, 99%) were respectively weighed in a stoichiometric molar ratio to obtain a $Li_{5.5}PS_{4.5}Br_{0.75}Cl_{0.75}$ sulfide solid electrolyte and the D50 particle diameter of the $Li_{5.5}PS_{4.5}Br_{0.75}Cl_{0.75}$ sulfide solid electrolyte powder was adjusted to 3 μm. Also, a solid electrolyte layer-forming $Li_{5.75}PS_{4.75}Cl_{1.25}$ sulfide solid electrolyte powder (D50: 3 μm) was prepared in the same manner except that the D50 particle diameter of the $Li_{5.75}PS_{4.75}Cl_{1.25}$ sulfide solid electrolyte powder was adjusted to 3 μm.

Separately, $LiNi_{0.9}Co_{0.07}Mn_{0.03}O_2$ as a cathode active material, the $Li_{5.75}PS_{4.75}Cl_{1.25}$ sulfide solid electrolyte powder (D50: 0.5 μm), carbon nanofibers (Sigma Aldrich, >98%) and carbon black (Super-P, Timcal Ltd.) as conductive materials, and polytetrafluoroethylene (PTFE, Dupon) as a binder were mixed in a weight ratio of 87:10:1:1:1, and the mixture was molded in a sheet form to prepare a cathode sheet. The cathode sheet was pressed onto an 18 μm-thick aluminum foil, as a cathode current collector, placed in a batch-type oil chamber, and subjected to a warm isostatic press process at a pressure of 490 megapascals (MPa) to form a compressed cathode layer.

Separately, a polyacrylic binder (produced by Xeon Corporation) was added to the solid electrolyte layer-forming $Li_{5.75}PS_{4.75}Cl_{1.25}$ sulfide solid electrolyte powder (D50: 3 μm) in a weight ratio of 99:1 to prepare a mixture. Xylene and diethylbenzene were added to the mixture and the mixture was stirred to prepare a solid electrolyte layer-forming slurry. The solid electrolyte layer-forming slurry was coated on a nonwoven fabric by using a blade coater and kept in ambient air at 40° C. and then further dried in a vacuum at 40° C. for 12 hours to form a solid electrolyte layer.

Separately, a Ni foil (having a thickness of 10 μm) was prepared as an anode current collector. Silver (having a primary particle diameter of 60 nm) and carbon black powder (having a primary particle diameter of 35 nm) were mixed in a weight ratio of 25:75 to prepare an anode active material. Polyvinylidene fluoride (#9300, Kureha Corporation) as a binder was added, in an amount of 7 wt % based on the total weight of the anode layer, to N-methylpyrrolidone (NMP) contained in a vessel together with the mixture of silver (having a primary particle diameter of 60 nm) and carbon black powder (having a primary particle diameter of 35 nm), and the mixture was stirred to prepare an anode layer-forming slurry. The anode layer-forming slurry was coated on the Ni foil by using a blade coater and dried in ambient air at 80° C. for 20 minutes and then further dried in a vacuum at 100° C. for 12 hours to form an anode layer.

The solid electrolyte layer was stacked on the anode layer, and the stacked layers were placed in a batch-type oil chamber and subjected to a warm isostatic press process at a pressure of 490 MPa to prepare a compressed layer of the anode layer and the solid electrolyte layer.

Separately, 30 g of the first bonding layer-forming $Li_{5.5}PS_{4.5}Br_{0.75}Cl_{0.75}$ sulfide solid electrolyte powder (D50: 3 μm), 3.57 g of the polyacrylic binder (produced by Xeon Corporation), 4.2 g of xylene, and 5.0 g of diethyl benzene were added to a vessel and mixed twice at a rotation speed of 2,000 rpm for about 1 minute. Additionally, a first bonding layer-forming slurry was prepared in the same manner as described above, except that zirconia balls were added to the vessel and two mixtures were mixed twice respectively using 2.0 g and 2.5 g of diethyl benzene instead of 5.0 g of diethyl benzene. The first bonding layer-forming slurry was coated on a polyethylene terephthalate film adhered with a non-woven fabric by screen printing, kept in ambient air at 40° C. and further dried in a vacuum at 40° C. for 12 hours to form a first bonding layer.

The first bonding layer (having a thickness of about 10 μm) was interposed between the compressed cathode layer and the compressed layer including the anode layer and the solid electrolyte layer, and the layers were roll-pressed at a pressure of 490 MPa to prepare a pouch-type all-solid secondary battery having a size of 2 cm×2 cm and a capacity of 18 mAh.

In this case, the $Li_{5.5}PS_{4.5}Br_{0.75}Cl_{0.75}$ sulfide solid electrolyte powder (D50: 3 μm) of the first bonding layer has about 12 GPa of sheet-typed Young's modulus (about 34 GPa of powder-typed Young's modulus) and the $Li_{5.75}PS_{4.75}Cl_{1.25}$ sulfide solid electrolyte powder (D50: 3 μm) of the solid electrolyte layer has about 17 GPa of sheet-typed Young's modulus (about 24 GPa of powder-typed Young's modulus). The $Li_{5.5}PS_{4.5}Br_{0.75}Cl_{0.75}$ sulfide solid electrolyte of the first bonding layer has a sheet-typed Young's modulus which is less than the sheet-typed Young's modulus of the $Li_{5.75}PS_{4.75}Cl_{1.25}$ sulfide solid electrolyte of the solid electrolyte layer by about 5 GPa, as measured by nanoindentation in accordance with ASTM E2546. The $Li_{5.5}PS_{4.5}Br_{0.75}Cl_{0.75}$ sulfide solid electrolyte of the first bonding layer has a powder-typed Young's modulus which is less than the powder-typed Young's modulus of the $Li_{5.75}PS_{4.75}Cl_{1.25}$ sulfide solid electrolyte of the solid electrolyte layer by about 10 GPa, as measured by nanoindentation in accordance with ASTM E2546.

Example 2

Preparation of All-Solid Secondary Battery

A pouch-type all-solid secondary battery having a size of 2 cm×2 cm and a capacity of 18 mAh was prepared by interposing the first bonding layer between the compressed cathode layer and the compressed layer of the anode layer and the solid electrolyte layer and roll pressing the layers at a pressure of 400 MPa instead of 490 MPa.

Example 3

Preparation of All-Solid Secondary Battery

A pouch-type all-solid secondary battery having a size of 2 cm×2 cm and a capacity of 18 mAh was prepared by interposing the first bonding layer between the compressed cathode layer and the compressed layer of the anode layer and the solid electrolyte layer and roll pressing the layers at a pressure of 300 MPa instead of 490 MPa.

Example 4

Preparation of All-Solid Secondary Battery

An all-solid secondary battery was prepared under an argon gas atmosphere as follows.

$Li_2S$ powder (Sigma Aldrich, 99%), $P_2S_5$ powder (Sigma Aldrich, 99%), and LiCl powder (Acros Organic, 99%) were respectively weighed in a stoichiometric molar ratio to obtain a $Li_{5.75}PS_{4.75}Cl_{1.25}$ sulfide solid electrolyte and combined to form a mixture. The mixture was mechanically milled using zirconia balls (having a diameter of 10 mm) and then subjected to high energy ball milling at a rotation speed of 600 rpm for about 45 hours to obtain a pulverized mixture. The pulverized mixture was stirred in anhydrous ethanol (Wako, 99.5%) at room temperature for 24 hours to obtain a homogeneous dark brown mixture. The mixture was dried in a vacuum at 80° C. for 3 hours and pulverized to obtain cathode layer-forming $Li_{5.75}PS_{4.75}Cl_{1.25}$ sulfide solid electrolyte powder (D50: 0.5 μm). Also, solid electrolyte layer-forming $Li_{5.75}PS_{4.75}Cl_{1.25}$ sulfide solid electrolyte powder (D50: 3 μm) was prepared in the same manner except that the D50 particle diameter of the $Li_{5.75}PS_{4.75}Cl_{1.25}$ sulfide solid electrolyte powder was adjusted to 3 μm. Also, first bonding layer-forming $Li_{5.5}PS_{4.5}Br_{0.75}Cl_{0.75}$ sulfide solid electrolyte powder (D50: 3 μm) was prepared in the same manner except that $Li_2S$ powder (Sigma Aldrich, 99%), $P_2S_5$ powder (Sigma Aldrich, 99%), and LiCl powder (Acros Organic, 99%) were respectively weighed in a stoichiometric molar ratio to obtain a $Li_{5.5}PS_{4.5}Br_{0.75}Cl_{0.75}$ sulfide solid electrolyte and the average particle diameter D50 of the $Li_{5.75}PS_{4.75}Cl_{1.25}$ sulfide solid electrolyte powder was adjusted to 3 μm.

Separately, 30 g of the first bonding layer-forming $Li_{5.5}PS_{4.5}Br_{0.75}Cl_{0.75}$ sulfide solid electrolyte powder (D50: 3 μm), 3.57 g of a polyacrylic binder (produced by Xeon Corporation), 4.2 g of xylene, and 5.0 g of diethyl benzene were added to a vessel and mixed twice at a rotation speed of 2,000 rpm for about 1 minute. Additionally, a first bonding layer-forming slurry was prepared in the same manner as described above, except that zirconia balls were added to the vessel and two mixtures were mixed twice respectively using 2.0 g and 2.5 g of diethyl benzene instead of 5.0 g of diethyl benzene. The first bonding layer-forming slurry was coated on a polyethylene terephthalate film adhered with a non-woven fabric by screen printing, kept in ambient air at 40° C. and further dried in a vacuum at 40° C. for 12 hours to form a first bonding layer.

Separately, $LiNi_{0.9}Co_{0.07}Mn_{0.03}O_2$ as a cathode active material, the $Li_{5.75}PS_{4.75}Cl_{1.25}$ sulfide solid electrolyte powder (D50: 0.5 μm), carbon nanofibers (Sigma Aldrich, >98%) and carbon black (Super-PC), Timcal Ltd.) as conductive materials, and polytetrafluoroethylene (PTFE, Dupon) as a binder were mixed in a weight ratio of 87:10:1:1:1, and the mixture was molded in a sheet form to prepare a cathode sheet. The cathode sheet was pressed onto an 18 μm-thick Al foil, as a cathode current collector, and the first bonding layer was transferred onto the cathode sheet to prepare a cathode layer on which the first bonding layer is disposed.

Separately, a Ni foil (having a thickness of 10 μm) was prepared as an anode current collector. Silver (having a primary particle diameter of 60 nm) and carbon black powder (having a primary particle diameter of 35 nm) were mixed in a weight ratio of 25:75 to prepare an anode active material. Polyvinylidene fluoride (#9300, Kureha Corporation) as a binder was added, in an amount of 7 wt % based on the total weight of the anode layer, to N-methylpyrrolidone (NMP) contained in a vessel together with the silver (having a primary particle diameter of 60 nm) and carbon black powder (having a primary particle diameter of 35 nm) and the mixture was stirred to prepare an anode layer-forming slurry. The anode layer-forming slurry was coated on the Ni foil by using a blade coater and dried in ambient air at 80° C. for 20 minutes, and then further dried in a vacuum at 100° C. for 12 hours to prepare an anode layer.

Separately, the solid electrolyte layer-forming $Li_{5.75}PS_{4.75}Cl_{1.25}$ sulfide solid electrolyte powder (D50: 3 μm) was mixed with a polyacrylic binder (produced by Xeon Corporation) in a weight ratio of 99:1 to prepare a mixture. Xylene and diethylbenzene were added to the mixture and the mixture was stirred to prepare a solid electrolyte layer-forming slurry. The solid electrolyte layer-forming slurry was coated on a non-woven fabric by using a blade coater and kept in ambient air at 40° C., and then further dried in a vacuum at 40° C. for 12 hours to form a solid electrolyte layer.

The solid electrolyte layer was stacked on the anode layer, and the layers were placed in a batch-type oil chamber and subjected to a warm isostatic press process at a pressure of 490 MPa to prepare a compressed layer of the anode layer and the solid electrolyte layer.

The cathode layer onto which the first bonding layer (having a thickness of about 10 μm) is transferred and the compressed layer of the anode layer and the solid electrolyte layer were roll-pressed at a pressure of 490 MPa to prepare an all-solid secondary battery having a size of 2 cm×2 cm and a capacity of 18 mAh.

In this case, the $Li_{5.5}PS_{4.5}Br_{0.75}Cl_{0.75}$ sulfide solid electrolyte powder (D50: 3 μm) of the first bonding layer has about 12 GPa of sheet-typed Young's modulus (about 34 GPa of powder-typed Young's modulus) and the $Li_{5.75}PS_{4.75}Cl_{1.25}$ sulfide solid electrolyte powder (D50: 3 μm) of the solid electrolyte layer has about 17 GPa of sheet-typed Young's modulus (about 24 GPa of powder-typed Young's modulus). The $Li_{5.5}PS_{4.5}Br_{0.75}Cl_{0.75}$ sulfide solid electrolyte of the first bonding layer has a sheet-typed Young's modulus which is less than the sheet-typed Young's modulus of the $Li_{5.75}PS_{4.75}Cl_{1.25}$ sulfide solid electrolyte of the solid electrolyte layer by about 5 GPa, as measured by nanoindentation in accordance with ASTM E2546. The $Li_{5.5}PS_{4.5}Br_{0.75}Cl_{0.75}$ sulfide solid electrolyte of the first bonding layer has a powder-typed Young's modulus which is less than the powder-typed Young's modulus of the $Li_{5.75}PS_{4.75}Cl_{1.25}$ sulfide solid electrolyte of the solid electrolyte layer by about 10 GPa, as measured by nanoindentation in accordance with ASTM E2546.

Comparative Example 1

Preparation of All-Solid Secondary Battery

A pouch-type all-solid secondary battery having a size of 2 cm×2 cm and a capacity of 18 mAh was prepared by roll-pressing the compressed cathode layer and the compressed layer of the anode layer and the solid electrolyte layer at a pressure of 490 MPa without interposing the first bonding layer therebetween.

Analysis Example 1

SEM Image

Figure 5A:
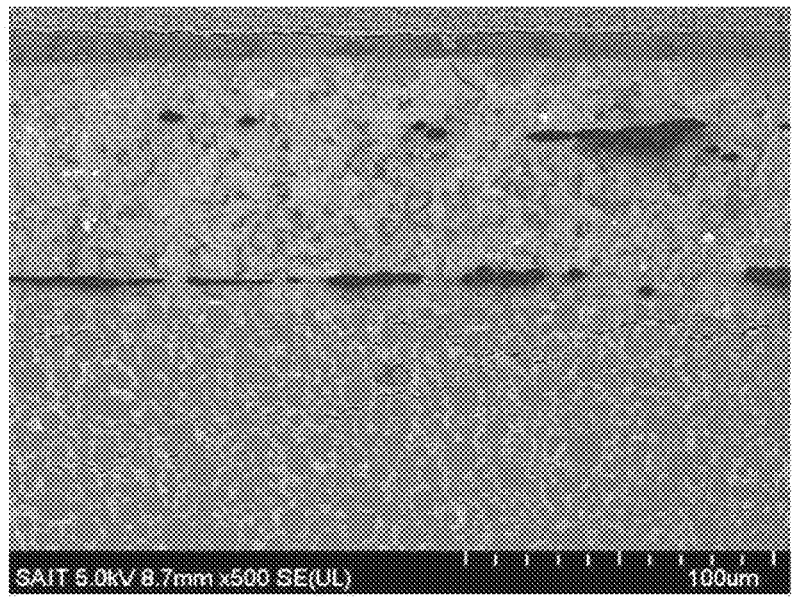
FIGS. 5A and 5B are scanning electron microscope (SEM) images of a cross-section of the all-solid secondary batteries manufactured according to Example 1 and Comparative Example 1, respectively.
Figure 5B:
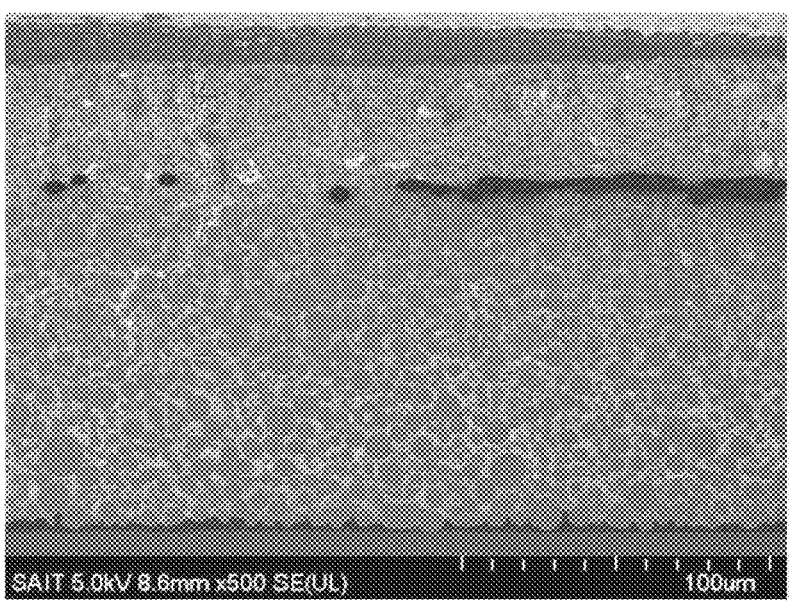

The all-solid secondary batteries according to Example 1 and Comparative Example 1 were disassembled and cross-sections thereof were analyzed by scanning electron microscopy (SEM). The results are shown in FIGS. 5A and 5B. An S-5500 (Hitachi) was used for scanning electron microscopy.

Referring to FIG. 5A, the first bonding layer having a thickness of about 10 μm is observed between the compressed cathode layer and the compressed layer of the anode layer and the solid electrolyte layer in the pouch-type all-solid secondary battery according to Example 1. Referring to FIG. 5B, the first bonding layer was not observed between the compressed cathode layer and the compressed layer of the anode layer and the solid electrolyte layer of the all-solid secondary battery according to Comparative Example 1.

Evaluation Example 1

Initial Impedance—Evaluation of Interfacial Resistance

The initial impedance of the all-solid secondary batteries according to Example 1 and Comparative Example 1 were evaluated.

Figure 6:
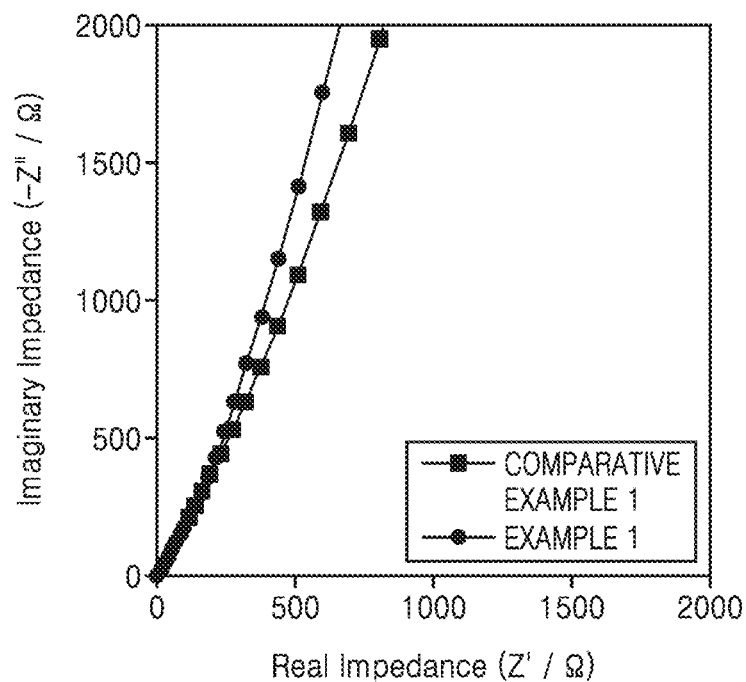
FIG. 6 is a graph of imaginary impedance (−Z", ohms) versus real impedance (Z', ohms), illustrating the initial impedance of the all-solid secondary batteries according to Example 1 and Comparative Example 1.

The initial impedance was evaluated by measuring resistance while applying a voltage bias of 10 millivolts (mV) at 25° C. in a frequency range of about $10^6$ hertz (Hz) to about 0.1 megahertz (MHz) according to a 2-probe method using an impedance analyzer (Solartron 1260A Impedance/Gain-Phase Analyzer). Nyquist plots, as the results, are shown in FIG. 6. In FIG. 6, initial bulk resistance of an electrode is determined based on a position and a size of a semicircle and a slope after the semicircle. A higher slope indicates a smaller resistance.

Referring to FIG. 6, it may be confirmed that the bulk resistance of the all-solid secondary battery according to Example 1 is less than that of the all-solid secondary battery according to Comparative Example 1.

Evaluation Example 2

Charge/Discharge Test: Evaluation of Rate Characteristics and Lifespan Characteristics Charge and discharge characteristics of the all-solid secondary batteries according to Examples 1 to 4 and Comparative Example 1 were evaluated using a charger/discharger (TOYO-3100 manufactured by TOYO).

2-1. Evaluation of Rate Characteristics

Figure 7A:
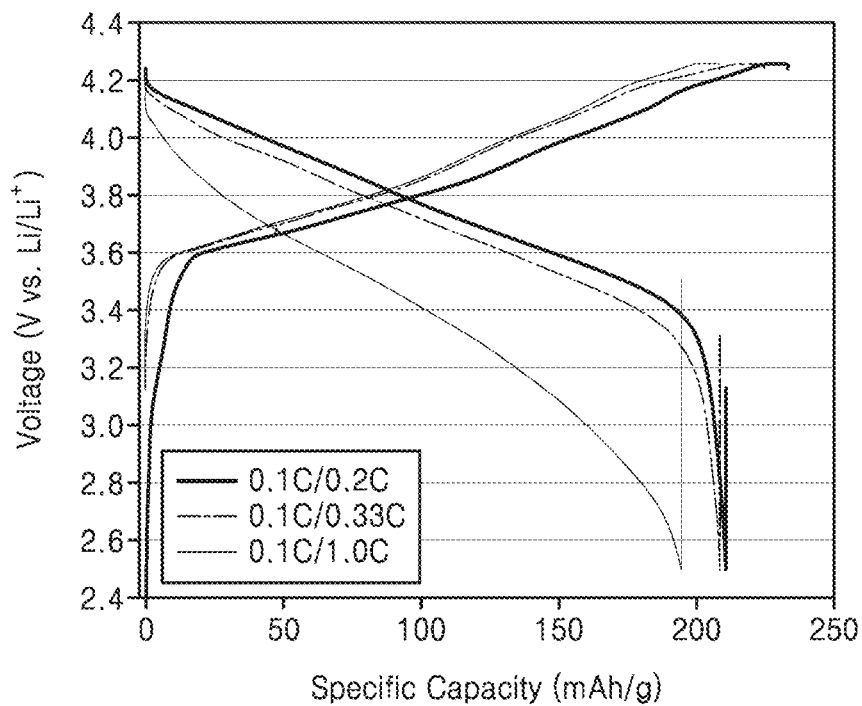
FIGS. 7A, 7B, and 7C are graphs of voltage relative to lithium (volts (V) vs lithium, V vs Li/Li$^+$) versus specific capacity (milliampere hours per gram, mAh/g), illustrating the rate properties of the all-solid secondary batteries according to Examples 1 and 4 and Comparative Example 1, respectively, during charging at a C-rate of 0.1 C and discharging at C-rates of 0.2 C, 0.33 C, and 1.0 C at 60° C. and in a voltage range of 2.5 V to 4.25 V.
Figure 7B:
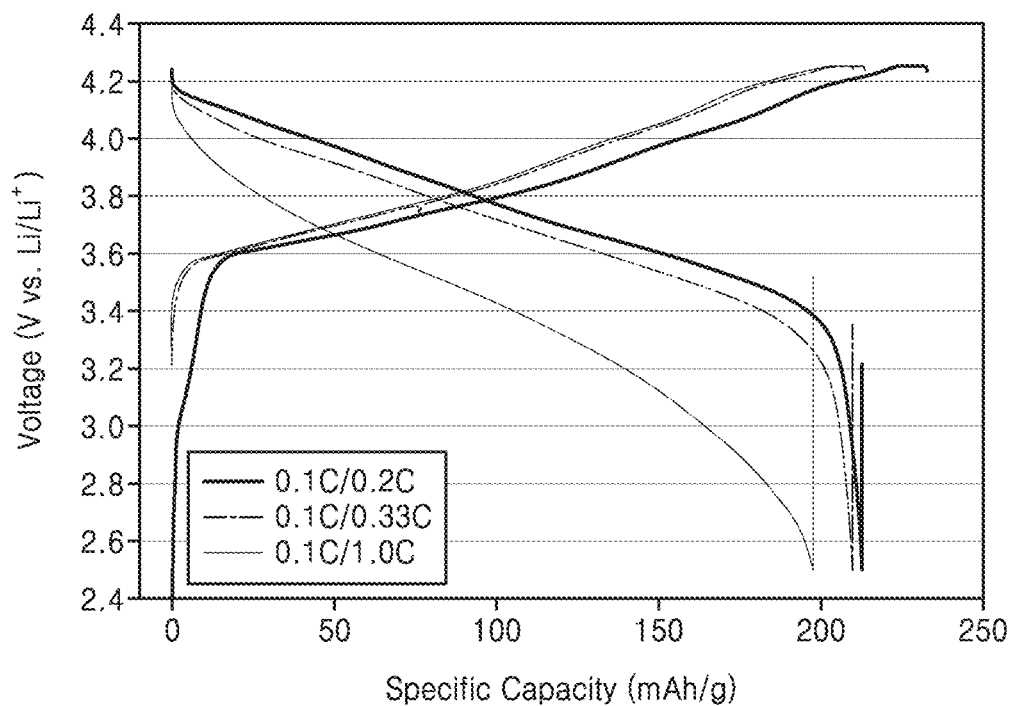
Figure 7C:
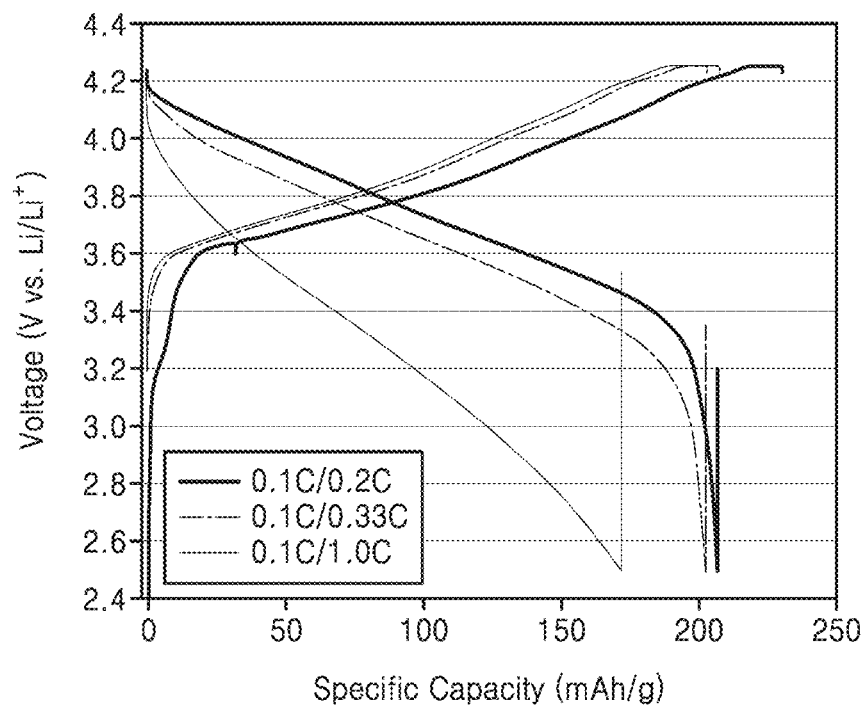

Each of the all-solid secondary batteries according to Examples 1 and 4 and Comparative Example 1 was charged with a constant current rate of 0.1 C in a thermostatic chamber at 60° C. until a voltage reached 4.25 V (vs. Li) and the voltage was maintained until the current reached 1/50 C. Then, the all-solid secondary battery was discharged at a rate of 0.2 C until the voltage reached 2.5 V (vs. Li) and rested for 10 minutes. Then, in second and subsequent cycles, each all-solid secondary battery was charged with a constant current rate of 0.1 C at the same temperature until the voltage reached 4.25 V (vs. Li) and the voltage was maintained until the current reached 1/50 C. Then, the all-solid secondary battery was discharged at a rate of 0.33 C or 1.0 C until the voltage reached 2.5 V (vs. Li). The results are shown in FIGS. 7A, 7B, and 7C. In this regard, rate characteristics were evaluated according to Equation 1 below.

Rate characteristics (%)=[(discharge capacity at 1.0 C)/(discharge capacity at 0.33 C)]×100%   Equation 1

Referring to FIGS. 7A and 7B, rate characteristics of the all-solid secondary batteries according to Examples 1 and 4, respectively, were both 94%. Referring to FIG. 7C, the rate characteristics of the all-solid secondary battery according to Comparative Example 1 was 85%. Thus, it may be confirmed that rate characteristics of the all-solid secondary batteries according to Examples 1 and 4 are better than that of the all-solid secondary battery according to Comparative Example 1.

2-2. Evaluation of Lifespan Characteristics

Each of the all-solid secondary batteries according to Examples 1 to 3 and Comparative Example 1 was placed in a thermostatic chamber at 60° C., charged at a C-rate of 0.1 C until the voltage reached 4.25 V (vs. Li), and while maintaining the voltage of 4.25 V (vs. Li), the charging process was cut-off at a C-rate of 0.05 C. Subsequently, the all-solid secondary battery was discharged at a C-rate of 0.1 C until the voltage reached 2.5 V (vs. Li) (Formation step, $1^{st}$ cycle). This charge/discharge process was further preformed two more times to complete the formation step.

The all-solid secondary battery having gone through the formation step was charged with a rate of 0.5 C until the voltage reached 4.25 V (vs. Li) at the same temperature and discharged at a rate of 0.5 C until the voltage reached 2.5 V (vs. Li).

Figure 8A:
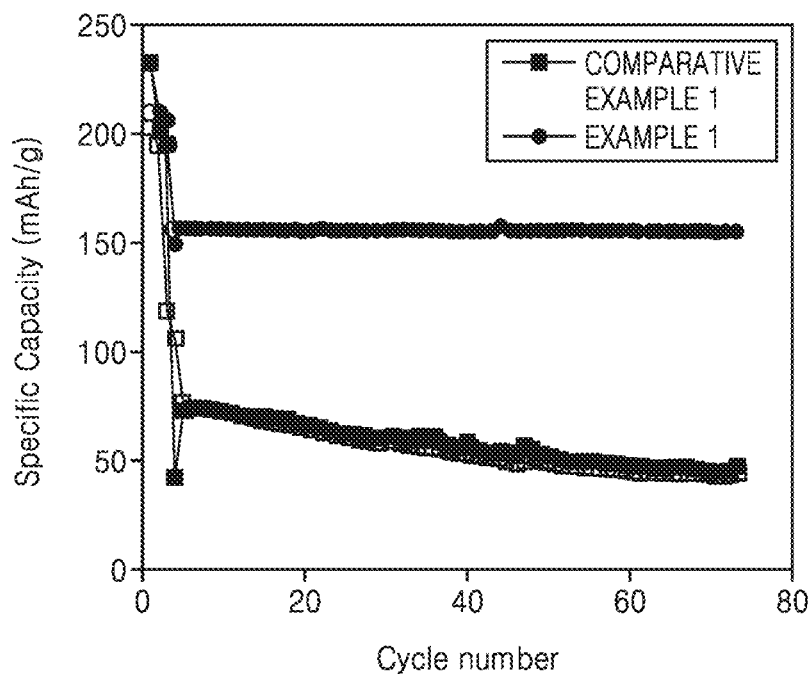
FIG. 8A is a graph of specific capacity (milliampere hours per gram, mAh/g) illustrating the lifespan characteristics of the all-solid secondary batteries of Example 1 and Comparative Example 1, during charging and discharging at 60° C. at a C-rate of 0.5 C and in a voltage range of 2.5 V to 4.25 V.
Figure 8B:
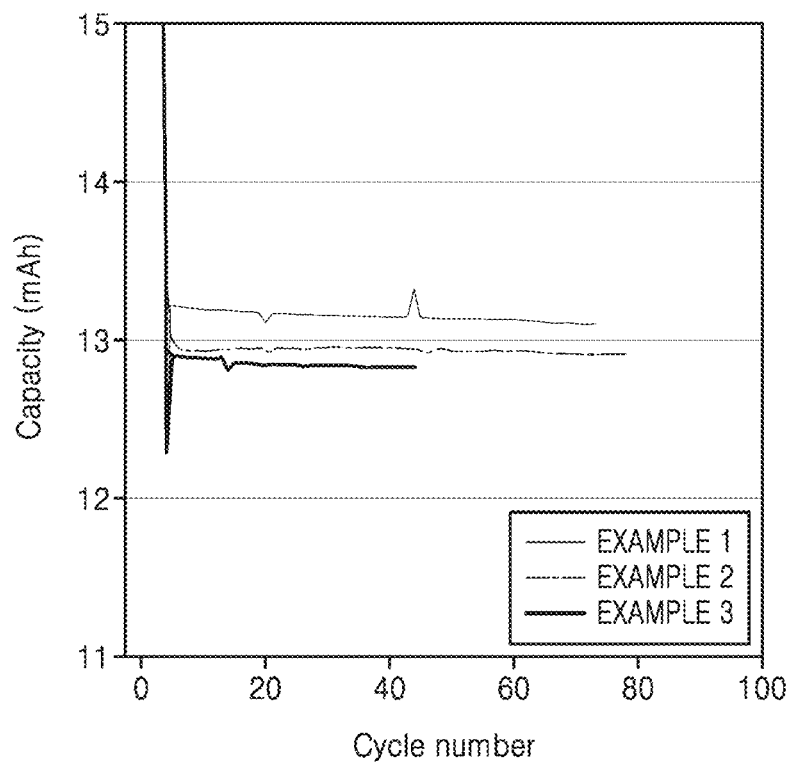
FIG. 8B is a graph of capacity (mAh) versus cycle number, illustrating the lifespan characteristics of the all-solid secondary batteries of Examples 1 to 3 during charging and discharging at 60° C. at a C-rate of 0.5 C (in a voltage range of 2.5 V to 4.25 V).

The charge/discharge process was repeated 70 times in total. Discharge capacity variation with respect to the number of cycles are shown in FIGS. 8A and 8B. In this regard, lifespan characteristics (i.e., capacity retention ratio) were evaluated according to Equation 2 below.

Lifespan characteristics (%)=[(discharge capacity after $70^{th}$ cycle)/(discharge capacity after $3^{rd}$ cycle)]×100%   Equation 2

Referring to FIG. 8A, the all-solid secondary battery according to Example 1 exhibited 99.1% of lifespan characteristics after the $70^{th}$ cycle, and the all-solid secondary battery according to Comparative Example 1 exhibited 56.0% of lifespan characteristics after the $70^{th}$ cycle. As a result, it may be confirmed that the all-solid secondary battery according to Example 1 has far better lifespan characteristics than those of the all-solid secondary battery according to Comparative Example 1.

Referring to FIG. 8B, although the all-solid secondary battery according to Example 3 had a less reversible capacity than those of the all-solid secondary batteries according to Examples 1 and 2, it was confirmed that lifespan characteristics of the all-solid secondary battery according to Example 3 maintained to about the $40^{th}$ cycle.

However, when the all-solid secondary battery is manufactured by interposing the first bonding layer (having a thickness of about 10 μm) between the compressed cathode layer and the compressed layer of the anode layer and the solid electrolyte layer and roll-pressing the layers at a pressure less than 300 MPa, a short-circuit may occur.

According to the all-solid secondary battery and the method of manufacturing the same according to the present disclosure, since the first bonding layer including a solid electrolyte having a Young's modulus which is less than the Young's modulus of the solid electrolyte layer by 10 GPa or greater is interposed between the cathode active material layer of the cathode layer and the solid electrolyte layer, battery performance such as rate characteristics and lifespan characteristics may be improved while simultaneously reducing the interfacial resistance between the cathode layer and the solid electrolyte layer.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An all-solid secondary battery comprising:
   an anode layer;
   a cathode layer;
   a solid electrolyte layer interposed between the anode layer and the cathode layer, the solid electrolyte layer comprising a first solid electrolyte; and
   a first bonding layer disposed between the cathode layer and the solid electrolyte layer, the first bonding layer comprising a second solid electrolyte, wherein the first solid electrolyte and the second solid electrolyte have a different composition, and wherein a Young's modulus of the first solid electrolyte is about 5 gigapascals to about 10 gigapascals greater than a Young's modulus of the second solid electrolyte,
   wherein the anode layer comprises
      an anode current collector and an anode active material layer disposed on the anode current collector, and
      the anode active material layer comprises a binder and an anode active material,
   wherein the cathode layer comprises
      a cathode current collector, and
      a cathode active material layer disposed on the cathode current collector.

2. The all-solid secondary battery of claim 1, wherein the anode active material does not contain an alkali metal.

3. The all-solid secondary battery of claim 1, wherein the first bonding layer is interposed between the cathode active material layer and the solid electrolyte layer.

4. The all-solid secondary battery of claim 1, wherein the first bonding layer is in contact with a surface of the cathode active material layer.

5. The all-solid secondary battery of claim 1, wherein the first bonding layer comprises a sulfide solid electrolyte represented by Formula 1:

$$Li_aM_bPS_cA_d \quad \text{Formula 1}$$

wherein, in Formula 1,
0<a≤6, 0≤b≤6, 0<c<6, and 0≤d≤6;
M is Ge, Sn, or Si; and
A is one or more halogen elements.

6. The all-solid secondary battery of claim 1, wherein the second solid electrolyte of the first bonding layer is an amorphous solid electrolyte, or a crystalline solid electrolyte, or a combination thereof.

7. The all-solid secondary battery of claim 1, wherein the second solid electrolyte comprises a particle having a D50 particle diameter of 3 micrometers or less.

8. The all-solid secondary battery of claim 1, wherein the first bonding layer has a thickness of 30 micrometers or less.

9. The all-solid secondary battery of claim 1, wherein the first solid electrolyte comprises $Li_2S$—$P_2S_5$, $Li_2S$—$P_2S_5$—LiX wherein X is a halogen atom, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ wherein m and n are positive numbers and Z is Ge, Zn, or Ga, $Li_2S$—$GeS_2$, $Li_2S$—$SiS_2$—$Li_3PO_4$, $Li_2S$—$SiS_2$—$Li_pMO_q$ wherein p and q are independently from 1 to 4 and M is P, Si, Ge, B, Al, Ga, or In, $Li_xM'_yPS_zA_w$ wherein x, y, z, and w are independently from 0 to 6, M' is Ge, Sn, or Si, and A is F, Cl, Br, or I; or
a combination thereof.

10. The all-solid secondary battery of claim 1, wherein the first solid electrolyte comprises a particle having a D50 particle diameter of about 1 micrometer to about 3.5 micrometers.

11. The all-solid secondary battery of claim 1, wherein the solid electrolyte layer has a thickness of about 10 micrometers to about 150 micrometers.

12. The all-solid secondary battery of claim 1, wherein a second bonding layer is in contact with a surface of the solid electrolyte layer facing the anode active material layer, and
the second bonding layer comprises a third solid electrolyte having a Young's modulus which is less than a Young's modulus of the first solid electrolyte wherein the first solid electrolyte and the third solid electrolyte have a different composition.

13. The all-solid secondary battery of claim 12, wherein the second bonding layer comprises an amorphous sulfide solid electrolyte.

14. The all-solid secondary battery of claim 1, wherein the anode active material comprises amorphous carbon, gold, platinum, palladium, silicon, silver, aluminum, bismuth, tin, zinc, or a combination thereof.

15. The all-solid secondary battery of claim 1, wherein the anode active material comprises amorphous carbon and gold, platinum, palladium, silicon, silver, aluminum, bismuth, tin, zinc, or a combination thereof.

16. The all-solid secondary battery of claim 1, wherein the anode active material comprises a particle having a D50 particle diameter of 4 micrometers or less.

17. The all-solid secondary battery of claim 1, wherein the anode active material layer has a thickness of about 1 micrometer to about 20 micrometers.

18. The all-solid secondary battery of claim 1, further comprising an alkali metal deposit layer between the anode current collector and the anode active material layer during charge of the all-solid secondary battery.

19. The all-solid secondary battery of claim 1, further comprising a film disposed between the anode current collector and the anode active material layer, and comprising a material disposed on the anode current collector which is capable of forming an alloy or compound with an alkali metal.

20. The all-solid secondary battery of claim 19, wherein the material capable of forming an alloy with the alkali metal comprises silicon, magnesium, aluminum, lead, silver, tin, or a combination thereof.

21. The all-solid secondary battery of claim 19, wherein the material capable of forming a compound with the alkali metal comprises carbon, titanium sulfide, iron sulfide, or a combination thereof.

22. The all-solid secondary battery of claim 19, wherein the film has a thickness of about 1 nanometer to about 500 nanometers.

23. The all-solid secondary battery of claim 19, further comprising an alkali metal deposit layer in an area on the anode active material layer, an area between the anode active material layer and the anode current collector, or a combination thereof.

24. The all-solid secondary battery of claim 1, wherein the anode active material comprises amorphous carbon and silver, and
an alkali metal is precipitated in the anode active material to form an alloy with silver during charging of the all-solid secondary battery.

25. A method of manufacturing the all-solid secondary battery according to claim 1, the method comprising:
providing a cathode layer;
compressing the cathode layer to form a compressed cathode layer;
providing an anode layer;
providing a solid electrolyte layer;
disposing the anode layer on the solid electrolyte layer to form a stack;
compressing the stack to form a compressed anode-electrolyte layer;
interposing a first bonding layer between the compressed cathode layer and the compressed anode-electrolyte layer; and
compressing the compressed cathode layer, the first bonding layer, and the compressed anode-electrolyte layer to form the all-solid secondary battery,
wherein the solid electrolyte layer comprises a first solid electrolyte, the first bonding layer comprises a second solid electrolyte, the first solid electrolyte and the second solid electrolyte have a different composition, and wherein a Young's modulus of the first solid electrolyte is about 5 gigapascals to about 10 gigapascals greater than a Young's modulus of the second solid electrolyte.

26. The method of claim 25, wherein the compressing of the cathode layer, the compressing of the stack, and the compressing of the compressed cathode layer, the first bonding layer, and the compressed anode-electrolyte layer each independently comprise a roll press method, a hot press method, or a combination thereof.

27. A method of manufacturing the all-solid secondary battery according to claim 1, the method comprising:
    providing a cathode layer;
    disposing a first bonding layer on a surface of the cathode layer to form a cathode comprising a first bonding layer;
    providing an anode layer;
    providing a solid electrolyte layer;
    disposing the anode layer on the solid electrolyte layer to form a stack;
    compressing the stack to form a compressed anode-electrolyte layer;
    stacking the cathode comprising the first bonding layer on the compressed anode-electrolyte layer; and
    compressing the cathode comprising the first bonding layer and the compressed anode-electrolyte layer to form the all-solid secondary battery,
    wherein the solid electrolyte layer comprises a first solid electrolyte, the first bonding layer comprises a second solid electrolyte, and the first solid electrolyte and the second solid electrolyte have a different composition, and wherein a Young's modulus of the first solid electrolyte is about 5 gigapascals to about 10 gigapascals greater than a Young's modulus of the second solid electrolyte.

28. The method of claim 27, wherein the disposing of the first bonding layer comprises coating the first bonding layer onto a surface of the cathode active material layer or transferring the first bonding layer onto the surface of the cathode active material layer.

29. The method of claim 28, wherein the compressing of the stack and the compressing of the cathode comprising the first bonding layer and the compressed anode-electrolyte layer each independently comprise a roll press method, a hot press method, or a combination thereof.

30. The all-solid secondary battery of claim 5,
    wherein the first solid electrolyte and the second solid electrolyte each comprise a sulfide solid electrolyte represented by Formula 1,
    wherein $0 < d \leq 6$, and
    wherein A in the first solid electrolyte is different than A in the second solid electrolyte.

31. The all-solid secondary battery of claim 30, wherein A in the first solid electrolyte is a single halogen and wherein A in the second electrolyte is a plurality of halogens.

* * * * *